United States Patent
Damnjanovic et al.

(10) Patent No.: US 8,699,487 B2
(45) Date of Patent: Apr. 15, 2014

(54) UPLINK DELAY BUDGET FEEDBACK

(75) Inventors: Aleksandar Damnjanovic, Del Mar, CA (US); Sai Yiu Duncan Ho, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 855 days.

(21) Appl. No.: 12/364,967

(22) Filed: Feb. 3, 2009

(65) Prior Publication Data
US 2009/0196275 A1 Aug. 6, 2009

Related U.S. Application Data

(60) Provisional application No. 61/026,046, filed on Feb. 4, 2008.

(51) Int. Cl.
*H04L 12/56* (2006.01)
*H04W 72/00* (2009.01)

(52) U.S. Cl.
USPC .............. 370/392; 370/395.4; 455/450

(58) Field of Classification Search
USPC ............ 370/389–393, 395.21–395.3; 455/450–452.3
See application file for complete search history.

(56) References Cited

U.S. PATENT DOCUMENTS

| | | |
|---|---|---|
| 5,535,214 A | 7/1996 | Shiobara |
| 5,592,470 A | 1/1997 | Rudrapatna et al. |
| 6,046,980 A | 4/2000 | Packer |
| 6,134,218 A | 10/2000 | Holden |
| 6,192,422 B1 | 2/2001 | Daines et al. |
| 6,469,991 B1 * | 10/2002 | Chuah .......................... 370/329 |
| 6,834,185 B2 | 12/2004 | Fujii |
| 7,127,255 B2 * | 10/2006 | Hsu et al. ................. 455/452.2 |
| 7,167,487 B2 * | 1/2007 | Herrmann .................... 370/477 |
| 7,508,762 B2 * | 3/2009 | Ohtani ......................... 370/235 |

(Continued)

FOREIGN PATENT DOCUMENTS

| | | |
|---|---|---|
| CN | 1478345 A | 2/2004 |
| CN | 1689261 A | 10/2005 |

(Continued)

OTHER PUBLICATIONS

3GPP TS 36.321, V8.0.0, Medium Access Control Protocol Specification 20071201, [Online] Dec. 1, 2007, pp. 1-23, XP002521635 Retrieved from the Internet : URL: http://www.quintillion.co.jp/3GPP/Specs/36321-800. pdf.

(Continued)

*Primary Examiner* — Thai Hoang
(74) *Attorney, Agent, or Firm* — Michael J. DeHaemer, Jr.

(57) ABSTRACT

Systems and methodologies are described that facilitate signaling and/or utilizing uplink delay budget related feedback in a wireless communication environment. A lowest delay budget associated with a most urgent Radio Link Control (RLC) service data unit (SDU) retained in a buffer of an access terminal can be determined. Further, a portion of a Medium Access Control (MAC) header (e.g., two reserved bits, . . . ) can be configured to carry a code related to a delay threshold corresponding to the lowest delay budget. Moreover, the MAC header can be transferred to a base station. The base station can detect the code carried by the portion of the MAC header, and a delay threshold can be determined as a function of the detected code (e.g., utilizing a radio bearer specific mapping). According to an example, the access terminal can be scheduled for uplink transmission as a function of the delay threshold.

26 Claims, 10 Drawing Sheets

(56) References Cited

U.S. PATENT DOCUMENTS

| | | | |
|---|---|---|---|
| 7,710,893 B2 | 5/2010 | Yoon et al. | |
| 7,764,661 B2 | 7/2010 | Heo et al. | |
| 8,005,089 B2 | 8/2011 | Chun et al. | |
| 2003/0035383 A1 | 2/2003 | Hershey | |
| 2003/0104817 A1 | 6/2003 | Damnjanovic | |
| 2003/0147371 A1* | 8/2003 | Choi et al. | 370/341 |
| 2003/0222817 A1* | 12/2003 | Gfeller et al. | 342/375 |
| 2004/0017795 A1 | 1/2004 | Abraham et al. | |
| 2004/0203973 A1 | 10/2004 | Khan | |
| 2005/0111451 A1* | 5/2005 | Kim | 370/389 |
| 2005/0143084 A1 | 6/2005 | Cheng et al. | |
| 2005/0250454 A1 | 11/2005 | Sebire et al. | |
| 2005/0256886 A1 | 11/2005 | Armanino et al. | |
| 2005/0265301 A1 | 12/2005 | Heo et al. | |
| 2005/0276359 A1 | 12/2005 | Xiong | |
| 2006/0146875 A1 | 7/2006 | Yang | |
| 2006/0182080 A1* | 8/2006 | Yang et al. | 370/347 |
| 2007/0019552 A1 | 1/2007 | Senarath et al. | |
| 2007/0189248 A1 | 8/2007 | Chang et al. | |
| 2007/0201369 A1 | 8/2007 | Pedersen et al. | |
| 2007/0245202 A1 | 10/2007 | Kim et al. | |
| 2007/0248035 A1 | 10/2007 | Sang et al. | |
| 2008/0002688 A1 | 1/2008 | Kim et al. | |
| 2008/0004030 A1 | 1/2008 | Frederiksen et al. | |
| 2008/0026744 A1 | 1/2008 | Frederiksen et al. | |
| 2008/0109694 A1 | 5/2008 | Jen | |
| 2008/0117881 A1 | 5/2008 | Golitschek Edler Von Elbwart et al. | |
| 2008/0161033 A1* | 7/2008 | Borran et al. | 455/522 |
| 2008/0232284 A1 | 9/2008 | Dalsgaard et al. | |
| 2008/0240030 A1 | 10/2008 | Kolding et al. | |
| 2008/0310345 A1 | 12/2008 | Chun et al. | |
| 2009/0092148 A1 | 4/2009 | Zhang et al. | |
| 2009/0109907 A1 | 4/2009 | Tsai et al. | |
| 2009/0122776 A1 | 5/2009 | Folkstedt et al. | |
| 2009/0141668 A1 | 6/2009 | Zhang et al. | |
| 2009/0141676 A1 | 6/2009 | Maheshwari et al. | |
| 2009/0161545 A1 | 6/2009 | Ho et al. | |
| 2009/0196364 A1* | 8/2009 | Nakajima et al. | 375/260 |
| 2009/0204867 A1 | 8/2009 | Ho | |
| 2010/0095183 A1 | 4/2010 | Petrovic et al. | |
| 2010/0198943 A1 | 8/2010 | Harrang et al. | |
| 2010/0235705 A1 | 9/2010 | Kim et al. | |
| 2010/0254480 A1* | 10/2010 | Park et al. | 375/295 |
| 2010/0281325 A1 | 11/2010 | Lohr et al. | |

FOREIGN PATENT DOCUMENTS

| | | |
|---|---|---|
| CN | 1799231 A | 7/2006 |
| CN | 1910886 A | 2/2007 |
| CN | 1961502 A | 5/2007 |
| CN | 101056469 A | 10/2007 |
| CN | ZL02814094 X | 5/2012 |
| EP | 1071226 | 1/2001 |
| EP | 0627827 | 10/2001 |
| EP | 1341336 A1 | 9/2003 |
| EP | 1353483 A2 | 10/2003 |
| EP | 1389847 A1 | 2/2004 |
| EP | 1511239 A2 | 3/2005 |
| JP | 2000183884 A | 6/2000 |
| JP | 2005073276 | 3/2005 |
| JP | 2005536159 A | 11/2005 |
| JP | 2006287522 A | 10/2006 |
| JP | 2007529938 A | 10/2007 |
| JP | 2007536826 A | 12/2007 |
| JP | 2008503182 A | 1/2008 |
| JP | 2009521872 | 6/2009 |
| JP | 2009525655 A | 7/2009 |
| JP | 2012114957 A | 6/2012 |
| KR | 20070024427 | 3/2007 |
| RU | 2149518 | 5/2000 |
| RU | 2216868 C2 | 11/2003 |
| RU | 2280958 C2 | 7/2006 |
| WO | 9835525 | 8/1998 |
| WO | 0072622 | 11/2000 |
| WO | WO0101624 A1 | 1/2001 |
| WO | 02041531 | 5/2002 |
| WO | WO02052800 A1 | 7/2002 |
| WO | WO02101956 A1 | 12/2002 |
| WO | 03047206 A1 | 6/2003 |
| WO | 2004019543 A1 | 3/2004 |
| WO | 2004042963 A1 | 5/2004 |
| WO | WO2004109991 | 12/2004 |
| WO | WO2005067262 | 7/2005 |
| WO | WO2005109727 A1 | 11/2005 |
| WO | WO2005125020 A1 | 12/2005 |
| WO | WO2005125226 A2 | 12/2005 |
| WO | WO2006030019 A2 | 3/2006 |
| WO | WO2006049438 A1 | 5/2006 |
| WO | WO2006051149 A1 | 5/2006 |
| WO | WO2006104344 | 10/2006 |
| WO | WO2006109123 A2 | 10/2006 |
| WO | WO2007024120 A1 | 3/2007 |
| WO | WO2007078173 A1 | 7/2007 |
| WO | WO2007087057 | 8/2007 |

OTHER PUBLICATIONS

International Search Report and Written Opinion—PCT/US2009/033105, International Search Authority—European Patent Office—Jun. 18, 2009.

Motorola: "Flow control" 3GPP DRAFT, R2-073540, Athens, Greece, Aug. 20-24, 2007 pp. 1-2.

Nec, et al: "DL flow control in LTE" 3GPP DRAFT, R2-081777, Shenzhen, China, Mar. 31-Apr. 4, 2008, Ch 2.1 Solutions.

Panasonic: "MAC flow control and related signaling" 3GPP DRAFT, R2-074147, Shanghai, China, Oct. 8-12, 2007.

Philips: "UE flow control when relaying to other interfaces e.g. To a bluetooth link" 3GPP DRAFT, TSGR2#32(02)2628, RAN WG2, Sep. 23-27, 2002, Xi"An, China, p. 2.

Qualcomm Europe: "DL flow control in LTE" 3GPP DRAFT, R2-080374, Sevilla, Spain, Jan. 14-18, 2008, pp. 1-2.

Rapporteur: "Draft TR 25.877 v2.0.0: High speed downlink packet access: Iub/Iur protocol aspects" 3GPP DRAFT, R3-020892, Orlando, FL US, Feb. 18-22, 2002, pp. 47-49.

The CDMA 2000 ITU-R RTT Candidate Submission 0,19 Online Jul. 27, 1998.

International Preliminary Report on Patentability—PCT/US04/04668—International Search Authority—IPEA/US—Alexandria, Virginia—Jul. 6, 2006.

Written Opinion—PCT/US04/004668, International Search Authority—European Patent Office—Sep. 27, 2004.

International Search Report—PCT/US04/004668, International Search Authority—European Patent Office—Sep. 27, 2004.

Taiwan Search Report—TW098103604—TIPO—Mar. 8, 2012.

Qualcomm Europe: "Happy Bits", 3GPP TSG-RAN WG2 #61, R2-081065, Feb. 11, 2008.

IEEE Computer Society and the IEEE Microwave Theory and Techniques Society: "IEEE Standard for Local and metropolitan area networks—Part 16: Air Interface for Fixed and Mobile Broadband Wireless Access Systems; Amendment 2: Physical and Medium Access Control Layers for Combined Fixed and Mobile Operation in Licensed Bands and Corrigendum 1"; IEEE Std 802.16e-2005 and IEEE Std 802.16/2004/Cor1-2005 (Feb. 28, 2006), XP017601713.

* cited by examiner

UPLINK DELAY BUDGET FEEDBACK

CROSS-REFERENCE TO RELATED APPLICATIONS

This application claims the benefit of U.S. Provisional Patent Application Ser. No. 61/026,046 entitled "UPLINK DELAY BUDGET FEEDBACK IN LTE" which was filed Feb. 4, 2008. The entirety of the aforementioned application is herein incorporated by reference.

BACKGROUND

I. Field

The following description relates generally to wireless communications, and more particularly to providing uplink delay budget feedback in a wireless communication system.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple access terminals. Each access terminal can communicate with one or more base stations via transmissions on forward and reverse links. The forward link (or downlink) refers to the communication link from base stations to access terminals, and the reverse link (or uplink) refers to the communication link from access terminals to base stations. This communication link can be established via a single-in-single-out, multiple-in-single-out or a multiple-in-multiple-out (MIMO) system.

MIMO systems commonly employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which can be referred to as spatial channels, where $N_S \leq \{N_T, N_R\}$. Each of the $N_S$ independent channels corresponds to a dimension. Moreover, MIMO systems can provide improved performance (e.g., increased spectral efficiency, higher throughput and/or greater reliability) if the additional dimensionalities created by the multiple transmit and receive antennas are utilized.

MIMO systems can support various duplexing techniques to divide forward and reverse link communications over a common physical medium. For instance, frequency division duplex (FDD) systems can utilize disparate frequency regions for forward and reverse link communications. Further, in time division duplex (TDD) systems, forward and reverse link communications can employ a common frequency region so that the reciprocity principle allows estimation of the forward link channel from reverse link channel.

Wireless communication systems oftentimes employ one or more base stations that provide a coverage area. A typical base station can transmit multiple data streams for broadcast, multicast and/or unicast services, wherein a data stream may be a stream of data that can be of independent reception interest to an access terminal. An access terminal within the coverage area of such base station can be employed to receive one, more than one, or all the data streams carried by the composite stream. Likewise, an access terminal can transmit data to the base station or another access terminal.

In Long Term Evolution (LTE) based systems, a base station typically schedules uplink transmissions for an access terminal. Accordingly, the access terminal can be unable to send an uplink transmission unless scheduled by the base station. The base station can obtain knowledge of data arrival at the access terminal, which can be utilized for scheduling purposes. Moreover, the base station can schedule uplink transmissions for the access terminal to fulfill Quality of Service (QoS) requirements. To schedule the access terminal, feedback related to buffer information can be provided by the access terminal to the base station. In general, more up-to-date and accurate feedback can lead to the more efficient scheduling. However, a tradeoff can exist such that as more feedback is sent by the access terminal over the uplink, more uplink overhead can be utilized.

Conventionally, an access terminal can notify a base station about data arrival and buffer size using a Buffer Status Report. The Buffer Status Report can indicate an amount of data retained in a buffer associated with the access terminal to be transmitted to the base station. Moreover, a prioritized bit rate (PBR), which is an average guaranteed rate that a service will receive during reasonable radio conditions, can be fulfilled by the base station counting an amount of uplink data received for a radio bearer. As a function of this count, the base station can recognize whether the prioritized bit rate is met.

The prioritized bit rate (PBR) can be an aspect of QoS. Another aspect of QoS can be a delay bound. To fulfill the delay bound requirement, the base station can leverage knowledge of duration of elapsed time while data has been waiting in a buffer of the access terminal. Without this information, the base station can fail to prioritize access terminals optimally and efficiently while fulfilling the delay bound requirement. Currently, however, delay information it typically not transferred from access terminal to base station. Accordingly, the base station can know an amount of data in the buffer of the access terminal as provided by Buffer Status Reports, while lacking knowledge of length of time that such data has been sitting in the buffer.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating signaling and/or utilization of uplink delay budget related feedback in a wireless communication environment. A lowest delay budget associated with a most urgent Radio Link Control (RLC) service data unit (SDU) retained in a buffer of an access terminal can be determined. Further, a portion of a Medium Access Control (MAC) header (e.g., two reserved bits, . . . ) can be configured to carry a code related to a delay threshold corresponding to the lowest delay budget. Moreover, the MAC header can be transferred to a base station. The base station can detect the code carried by the portion of the MAC header, and a delay threshold can be determined as a function of the detected code (e.g., utilizing a radio bearer specific mapping). According to an example, the access terminal can be scheduled for uplink transmission as a function of the delay threshold.

According to related aspects, a method that facilitates providing uplink delay budget feedback in a wireless communication environment is described herein. The method can include determining a lowest delay budget from a plurality of Radio Link Control (RLC) service data units (SDUs). Further, the method can include configuring a portion of a Medium Access Control (MAC) header to include at least one code corresponding to a delay threshold for the lowest delay budget. Moreover, the method can comprise transmitting the MAC header to a base station.

Another aspect relates to a wireless communications apparatus. The wireless communications apparatus can include a memory that retains instructions related to identifying a lowest delay budget from a plurality of Radio Link Control (RLC) service data units (SDUs), setting a portion of a Medium Access Control (MAC) header to include at least one code corresponding to a delay threshold for the lowest delay budget, and sending the MAC header to a base station. Further, the wireless communications apparatus can include a processor, coupled to the memory, configured to execute the instructions retained in the memory.

Yet another aspect relates to a wireless communications apparatus that enables signaling delay budget related feedback to a base station in a wireless communication environment. The wireless communications apparatus can include means for identifying a Radio Link Control (RLC) service data unit (SDU) with a lowest delay budget from a set of RLC SDUs retained in a buffer awaiting uplink transmission. Moreover, the wireless communications apparatus can include means for configuring a portion of a Medium Access Control (MAC) header to include a code corresponding to a delay threshold associated with the lowest delay budget. Further, the wireless communications apparatus can include means for sending the MAC header to a base station.

Still another aspect relates to a computer program product that can comprise a computer-readable medium. The computer-readable medium can include code for identifying a Radio Link Control (RLC) service data unit (SDU) with a lowest delay budget from a set of RLC SDUs retained in a buffer awaiting uplink transmission. Moreover, the computer-readable medium can comprise code for setting values of two reserved bits included in a Medium Access Control (MAC) header to convey a delay threshold associated with the lowest delay budget. Further, the computer-readable medium can include code for sending the MAC header to a base station.

In accordance with another aspect, an apparatus in a wireless communication system can include a processor, wherein the processor can be configured to determine a lowest delay budget from a plurality of Radio Link Control (RLC) service data units (SDUs). Further, the processor can be configured to configure a portion of a Medium Access Control (MAC) header to include at least one code corresponding to a delay threshold for the lowest delay budget. Moreover, the processor can be configured to transmit the MAC header to a base station.

According to other aspects, a method that facilitates obtaining uplink delay budget feedback in a wireless communication environment is described herein. The method can include receiving a Medium Access Control (MAC) header from an access terminal. Further, the method can include detecting a code carried by a portion of the MAC header. Moreover, the method can include determining a delay threshold that corresponds to the code, the delay threshold being a range that includes a lowest delay budget associated with a particular Radio Link Control (RLC) service data unit (SDU) from a set of RLC SDUs retained in a buffer of the access terminal. The method can also include scheduling the access terminal for uplink transmission based at least in part upon the delay threshold.

Yet another aspect relates to a wireless communications apparatus that can include a memory that retains instructions related to detecting a code carried by a portion of a Medium Access Control (MAC) header received from an access terminal, identifying a delay threshold that corresponds to the code, the delay threshold relates to a delay budget of a Radio Link Control (RLC) service data unit (SDU) retained in a buffer of the access terminal, and scheduling the access terminal for uplink transmission based at least in part upon the delay threshold. Further, the wireless communications apparatus can comprise a processor, coupled to the memory, configured to execute the instructions retained in the memory.

Another aspect relates to a wireless communications apparatus that enables obtaining delay budget related feedback from an access terminal in a wireless communication environment. The wireless communications apparatus can include means for receiving a Medium Access Control (MAC) header from an access terminal. Further, the wireless communications apparatus can include means for detecting a code carried by a subset of bits of the MAC header. Moreover, the wireless communications apparatus can include means for deciphering a delay threshold that corresponds to the code, the delay threshold relates to a head-of-line delay budget of a Radio Link Control (RLC) service data unit (SDU) retained in a buffer of the access terminal.

Still another aspect relates to a computer program product that can comprise a computer-readable medium. The computer-readable medium can include code for receiving a Medium Access Control (MAC) header from an access terminal. Moreover, the computer-readable medium can include code for detecting a code carried by a subset of bits of the MAC header. Further, the computer-readable medium can include code for deciphering a delay threshold that corresponds to the code, the delay threshold relates to a head-of-line delay budget of a Radio Link Control (RLC) service data unit (SDU) retained in a buffer of the access terminal. The computer-readable medium can also include code for scheduling the access terminal for uplink transmission as a function of the delay threshold.

In accordance with another aspect, an apparatus in a wireless communication system can include a processor, wherein the processor can be configured to detect a code carried by two reserved bits included in a Medium Access Control (MAC) header received from an access terminal. Further, the processor can be configured to determine a delay threshold that corresponds to the code, the delay threshold being a range that includes a lowest delay budget associated with a particular Radio Link Control (RLC) service data unit (SDU) from a set of RLC SDUs retained in a buffer of the access terminal. Moreover, the processor can be configured to schedule the access terminal for uplink transmission based at least in part upon the delay threshold.

Toward the accomplishment of the foregoing and related ends, the one or more embodiments comprise the features hereinafter fully described and particularly pointed out in the claims. The following description and the annexed drawings set forth herein detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
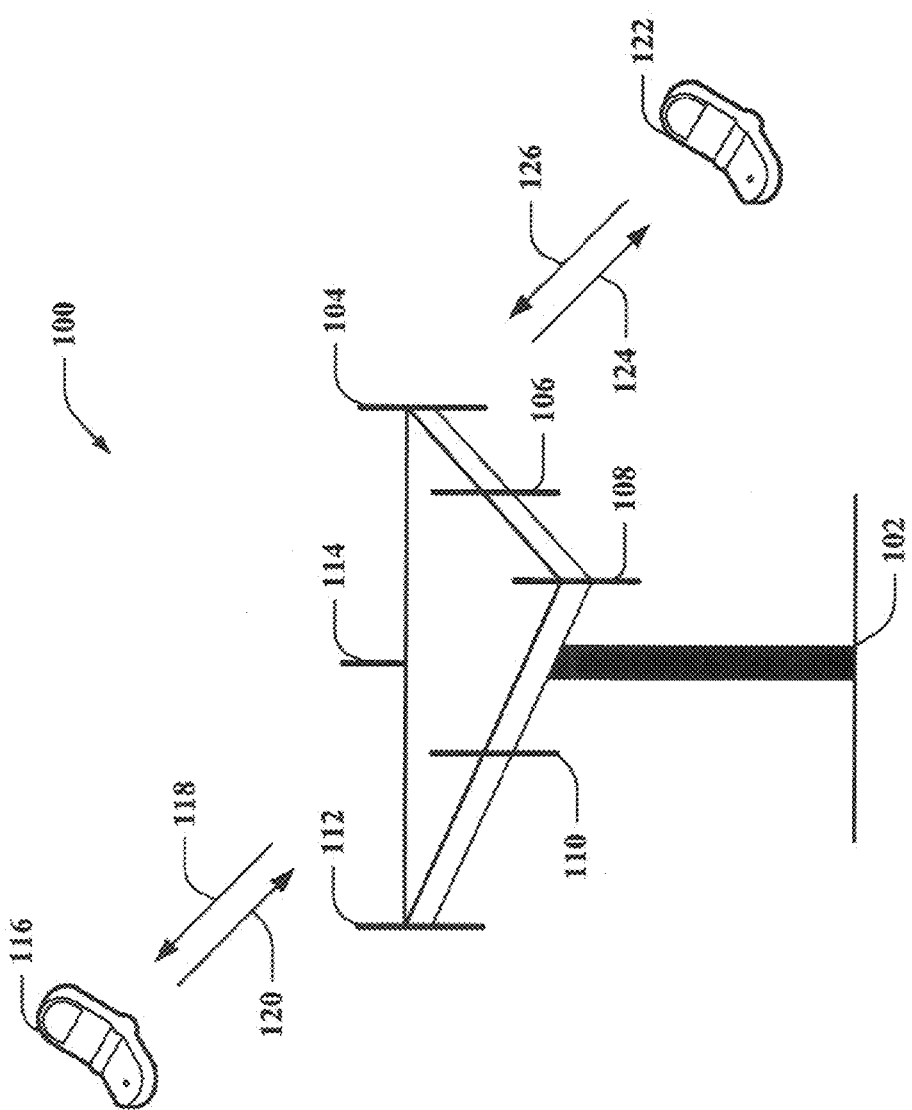
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB) or some other terminology.

Various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage, access terminals in neighboring cells can be subject to less interference as compared to a base station transmitting through a single antenna to all its access terminals.

System 100 enables transferring delay related information (e.g., delay budget, . . . ) from access terminals 116, 122 to base station 102. Base station 102 can utilize the delay related information when scheduling access terminals 116, 122 for uplink transmissions. For instance, the delay related information can pertain to length of time that data is waiting in a buffer associated with a particular access terminal (e.g., access terminal 116, access terminal 122, . . . ). The data can be retained in the buffer while waiting to be transferred via the uplink to base station 102. Base station 102 can leverage the delay related information to optimally and/or efficiently prioritize uplink transmissions from access terminals 116, 122, while fulfilling respective delay bound requirements. The delay bound requirements can be, for example, specified as part of Quality of Service (QoS) attributes.

In addition to delay related information, access terminals 116, 122 can feedback information related to data arrival and buffer size using Buffer Status Reports. Moreover, scheduling of uplink transmissions can be effectuated by base station 102 to additionally and/or alternatively satisfy other aspect(s) of QoS attributes such as, for example, throughput (e.g., prioritized bit rate (PBR), maximum bit rate (MBR), guaranteed bit rate (GBR), . . . ), bit error rate, and the like.

Figure 2:
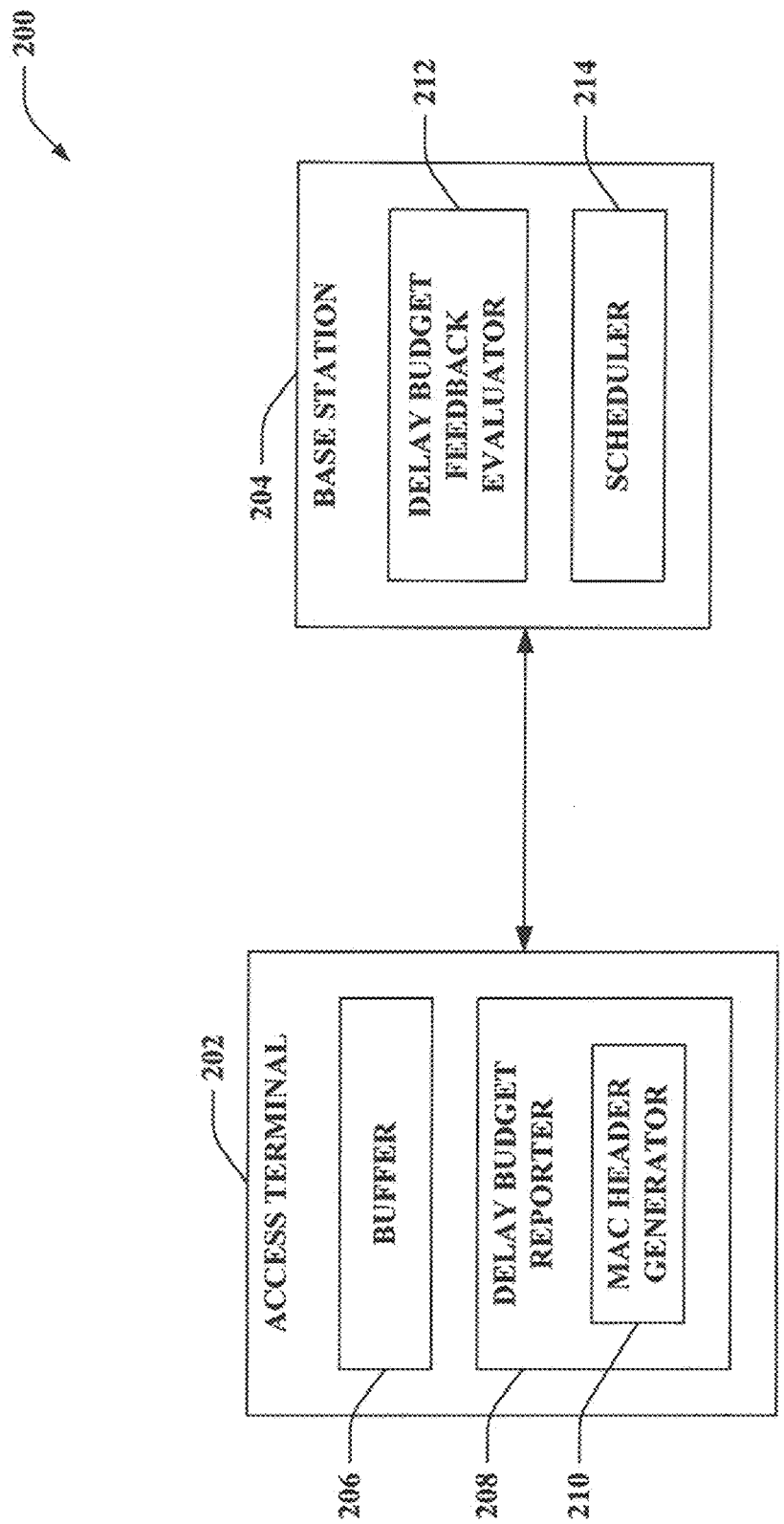
FIG. 2 is an illustration of an example system that transfers and employs uplink delay budget feedback in a wireless communication environment.

Referring to FIG. 2, illustrated is a system 200 that transfers and employs uplink delay budget feedback in a wireless communication environment. System 200 includes an access terminal 202 that can transmit and/or receive information, signals, data, instructions, commands, bits, symbols, and the like. Access terminal 202 can communicate with a base station 204 via the forward link and/or reverse link. Base station 204 can transmit and/or receive information, signals, data, instructions, commands, bits, symbols, and the like. Moreover, although not shown, it is contemplated that any number of access terminals similar to access terminal 202 can be included in system 200 and/or any number of base stations similar to base station 204 can be included in system 200. According to an illustration, system 200 can be a Long Term Evolution (LTE) based system; however, the claimed subject matter is not so limited.

Access terminal 202 can include a buffer 206 and a delay budget reporter 208. Buffer 206 can temporarily store data to be transmitted over an uplink from access terminal 202 to base station 204. Buffer 206 can be a routine, storage medium, etc. that can compensate for a difference in rate of flow of data, time of occurrence of events, and the like when transferring data from access terminal 202 to base station 204. For example, data can arrive and be retained by buffer 206 of access terminal 202 until an uplink assignment is obtained from base station 204. Upon being scheduled, access terminal 202 can transmit the data using uplink resources corresponding to the assignment.

Delay budget reporter 208 can determine head-of-line delay budget information for data retained in buffer 206. Head-of-line can refer to data to be transmitted first (e.g., most urgent, . . . ) from a set of data (e.g., data retained in buffer 206, . . . ). The head-of-line delay budget can be a maximum delay that can be tolerated before exceeding a delay bound for data with a highest urgency retained in buffer 206. According to an example, the data retained in buffer 206 can be a Radio Link Control (RLC) service data unit (SDU) (e.g., an RLC SDU can include compressed Internet Protocol (IP) packets, . . . ). Following this example, the head-of-line delay budget generated by delay budget reporter 208 can be a maximum delay that the most urgent RLC SDU can tolerate before exceeding a delay bound corresponding to such RLC SDU. By way of illustration, the most urgent RLC SDU can be a particular RLC SDU associated with a lowest maximum amount of remaining time prior to exceeding a corresponding delay bound (e.g., a lowest delay budget, . . . ) from a set of RLC SDUs; however, it is to be appreciated that the claimed subject matter is not so limited. Further, the most urgent RLC SDU can be a new RLC transmission or a retransmission. Moreover, as an RLC SDU remains in buffer 206 (e.g., waiting prior to transmission to base station 204, . . . ), the delay budget of such RLC SDU can continue to diminish over time.

Data to be transmitted by access terminal 202 can be processed prior to being retained in buffer 206. For instance, compression and/or ciphering can be effectuated upon the data at a Packet Data Control Protocol (PDCP) layer. Further, the data can be formatted at a Radio Link Control (RLC) layer. Upon being scheduled for uplink transmission, the RLC layer can provide reliable layer 2 transmission of the data (e.g., the RLC layer can mitigate error(s) introduced at a Physical (PHY) layer during transmission, . . . ). An RLC SDU, however, cannot be transmitted over the uplink until base station 202 schedules access terminal 202 for such transmission. Accordingly, RLC SDU(s) can remain in buffer 206 for various period(s) of time. Delay budget reporter 208 can measure an amount of time that remains until expiration of a delay budget of a most urgent, head-of-line RLC SDU. Moreover, delay budget reporter 208 can send an indication corresponding to the head-of-line delay budget of the most urgent RLC SDU to base station 204. When access terminal 202 obtains an uplink grant of x bytes, for instance, one or more RLC packet data unit(s) (PDU(s)) can be formed to fill the allocated x bytes of space. It is contemplated that an RLC SDU can fit into one RLC PDU, a segment of the RLC SDU can fit into one RLC PDU (e.g., leaving a remainder to be retained in buffer 206, . . . ), and so forth. Thus, access terminal 202 can form RLC PDU(s) when a transmitter (not shown) is ready to transmit such RLC PDU(s).

Each RLC SDU can be time stamped (e.g., by delay budget reporter 208, . . . ) when it arrives at buffer 206 (e.g., PDCP buffer, . . . ). Time stamping, for instance, can additionally be leveraged as part of an SDU discard function. Further, delay budget reporter 208 can compute a remaining delay budget by performing subtraction operation(s). For example, delay budget reporter 208 can determine a difference between a current time (e.g., at which the delay budget is being evaluated, . . . ) and a time stamp to identify a current length of time that an RLC SDU has been delayed (e.g., while retained in buffer 202, . . . ). Moreover, the current length of time that the RLC SDU has been delayed can be subtracted from a delay bound to yield the remaining delay budget. The delay bound, for instance, can be provided in a quality class identifier (QCI).

Delay budget reporter 208 can further include a MAC header generator 210 that formats a Medium Access Control (MAC) header based upon the value of the head-of-line delay budget as yielded by delay budget reporter 208. For example, MAC header generator 210 can configure at least a portion of a MAC header to include at least one code corresponding to a delay threshold for the delay budget yielded by delay budget reporter 208. Each MAC header can include two reserved bits. These two reserved bits can be utilized by delay budget reporter 208 to indicate a delay budget to base station 204. For instance, MAC header generator 210 can set values for the two reserved bits included in a MAC header to convey delay budget information of the most urgent RLC SDU (e.g., a most urgent RLC SDU within a radio bearer (RB), . . . ).

According to an example, a delay bound can be 200 ms (e.g., as specified in a QCI, . . . ). Delay budget reporter 208 can determine a delay budget for a most urgent RLC SDU. Based upon the determined delay budget, MAC header generator 210 can set values of the two reserved bits in the MAC header, where the values provide a code that corresponds to a delay threshold related to the determined delay budget. Pursuant to this example, MAC header generator 210 can set the value of the two bits to '00' when the delay budget is less than 50 ms, '01' when the delay budget is greater than or equal to 50 ms but less than 100 ms, '10' when the delay budget is greater than or equal to 100 ms but less than 150 ms, or '11' when the delay budget is greater than 150 ms. It is to be appreciated, however, that any mappings between delay thresholds (e.g., delay budget ranges, . . . ) and MAC header reserved bit values (e.g., codes, . . . ) in addition to or instead of the aforementioned mappings can be employed. Further, it is contemplated that a delay bound of 200 ms is provided as an illustration, and the claimed subject matter supports employment of any delay bound(s) in addition to or instead of 200 ms.

Base station 204 can further include a delay budget feedback evaluator 212 and a scheduler 214. Delay budget feedback evaluator 212 can analyze delay budget feedback obtained from access terminal 202 (and/or any disparate access terminal(s) (not shown)). For instance, delay budget feedback evaluator 212 can identify delay budget information conveyed via a code carried by a portion of a MAC header (e.g., two reserved bits included in a MAC header, . . . ) received from access terminal 202. For instance, delay budget feedback evaluator 212 can employ a predefined mapping of delay thresholds to MAC header reserved bit values (e.g., the mapping can be known by access terminal 202 and base station 204 prior to transmission of the delay budget information via the uplink, . . . ).

As a result of the foregoing, base station 204 can continuously receive up-to-date delay budget information of a most urgent RLC SDU from access terminal 202. Based at least in part upon the up-to-date delay budget information at a given time, scheduler 214 can assign uplink radio resources to access terminal 202 (and/or any disparate access terminal(s)). For instance, scheduler 214 can prioritize access terminals including access terminal 202 based at least in part upon the delay budget information. Further, scheduler 214 can yield radio resource assignments based upon radio conditions, traffic volume, QoS requirements (e.g., throughput, bit error rate, delay bound, . . . ), and the like.

According to an example, delay budget reporter 208 can utilize MAC header generator 210 to set the value of the two reserved bits in the MAC header according to the delay budget of a most urgent RLC SDU that is not included in a current transfer block. Following this example, scheduler 214 can send an uplink grant to access terminal 202; the uplink grant can indicate a number of bits that can be transferred over the uplink by access terminal 202. This number of bits can be referred to as a transfer block. Pursuant to an illustration, an uplink grant yielded by scheduler 214 can assign a transfer block of 1000 bits to be utilized by access terminal 202; however, it is to be appreciated that any number of bits can be allocated to access terminal 202 as part of a transfer block assigned in an uplink grant by scheduler 214. Moreover, access terminal 202 can serve various services. Thus, access terminal 202 can determine how to separate the overall number of bits of the transfer block for utilization in connection with the various services served thereby. Accordingly, delay budget reporter 208 can identify a most urgent RLC SDU retained in buffer 206 that is not to be sent as part of a current transfer block (e.g., to be transmitted as part of a subsequent transfer block in response to a next uplink grant allotted by scheduler 214, . . . ), and the delay budget corresponding to this most urgent RLC SDU can be encoded upon the two reserved bits in a MAC header that is sent by access terminal 202 within the current transfer block.

Figure 3:
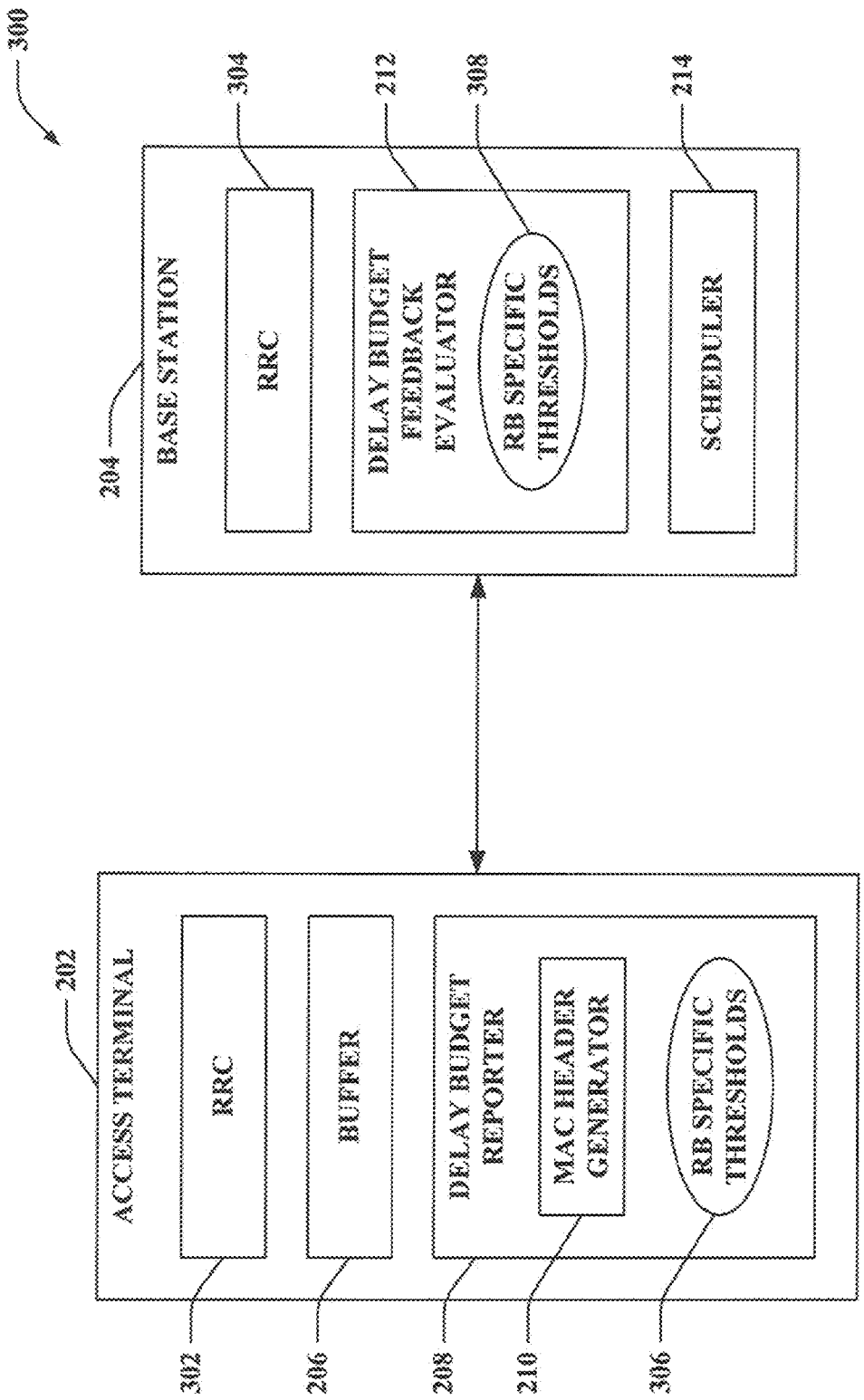
FIG. 3 is an illustration of an example system that configures radio bearer (RB) specific delay thresholds in a wireless communication environment.

Now turning to FIG. 3, illustrated is a system 300 that configures radio bearer (RB) specific delay thresholds in a wireless communication environment. System 300 includes access terminal 202 and base station 204. Access terminal 202 can include buffer 206 and delay budget reporter 208, which can further comprise MAC header generator 210. Moreover, base station 204 can include delay budget feedback evaluator 212 and scheduler 214.

Access terminal 202 and base station 204 can each further include radio resource control (RRC) (e.g., access terminal 202 can include RRC 302 and base station 204 can include RRC 304, . . . ). RRC 302 and RRC 304 can each be part of the Universal Mobile Telecommunication System (UMTS) wideband code division multiple access (WCDMA) protocol stack and can handle control plane signaling of layer 3 between access terminal 202 and a radio access network (e.g., base station 204, a radio network controller, . . . ); for instance, RRC 302 and RRC 304 can manage how resources are dynamically assigned in uplink and downlink directions of an air interface. Further, RRC 302 and RRC 304 can perform various functions such as, for example, broadcast of system information, paging (e.g., notification, release, . . . ), connection management (e.g., establishment, release, . . . ), mobility functions/procedures, radio bearer (RB) management (e.g., establishment, reconfiguration, releases, . . . ), measurement reporting and control, and so forth.

System 300 can be a multiple radio bearer system. A radio bearer (RB) can be an information path of defined capacity, delay, bit error rate, etc. Access terminal 202 can serve one or more radio bearers. Further, access terminal 202 can employ uplink rate control mechanisms to manage and/or share uplink resources across the one or more radio bearers. Moreover, for instance, a radio bearer can correspond to a logical channel.

RRC 302 and/or RRC 304 can configure delay thresholds per radio bearer (RB) (e.g., RB specific thresholds 306, RB specific thresholds 308, . . . ). For instance, a respective set of four delay thresholds can be defined for each radio bearer by RRC 302 and/or RRC 304. Thus, since each radio bearer can have varying degrees of sensitive to ranges of delays (e.g., depending on application associated with each radio bearer, . . . ), system 300 can provide flexibility by enabling RRC 302 and/or RRC 304 to configure the four delay thresholds per radio bearer.

Delay budget reporter 208 of access terminal 202 can leverage RB specific thresholds 306 and delay budget feedback evaluator 212 can leverage RB specific thresholds 308. It is contemplated that RB specific thresholds 306 and RB specific thresholds 308 can be substantially similar. By way of illustration, delay budget reporter 208 (and/or MAC header generator 210, . . . ) can utilize RB specific thresholds 306 to set values for two reserved bits included in a MAC header to correspond to a delay budget as a function of radio bearer. The MAC header can carry a logical channel identifier (ID), which is one-to-one mapped to the radio bearer. Moreover, delay budget feedback evaluator 212 can determine the delay budget based upon the values of the two reserved bits included in a MAC header received from access terminal 202. For example, delay budget feedback evaluator 212 can recognize the logical channel ID carried by the received MAC header, determine the radio bearer that maps to the recognized logical channel ID, and decipher a delay threshold specific to the determined radio bearer based upon RB specific thresholds 308 and the values of the two reserved bits included in the MAC header.

According to an example, a first radio bearer can be associated with a first service (e.g., web browser service, . . . ) and a second radio bearer can be associated with a second service (e.g., file transfer protocol (ftp) service, . . . ). RRC 302 and/or RRC 304 can define a first set of delay thresholds for the first radio bearer (e.g., less than 50 ms, greater than or equal to 50 ms and less than 100 ms, greater than or equal to 100 ms and less than 150 ms, greater than or equal to 150 ms) and a second set of delay thresholds for the second radio bearer (e.g., less than 100 ms, greater than or equal to 100 ms and less than 200 ms, greater than or equal to 200 ms and less than 300 ms, greater than or equal to 300 ms). Both sets of delay thresholds can be included in both RB specific thresholds 306 and RB specific thresholds 308 for utilization as described herein. It is contemplated that any number of sets of delay thresholds corresponding to any number of radio bearers can be included in RB specific thresholds 306 and RB specific thresholds 308 as defined by RRC 302 and/or RRC 304.

Figure 4:
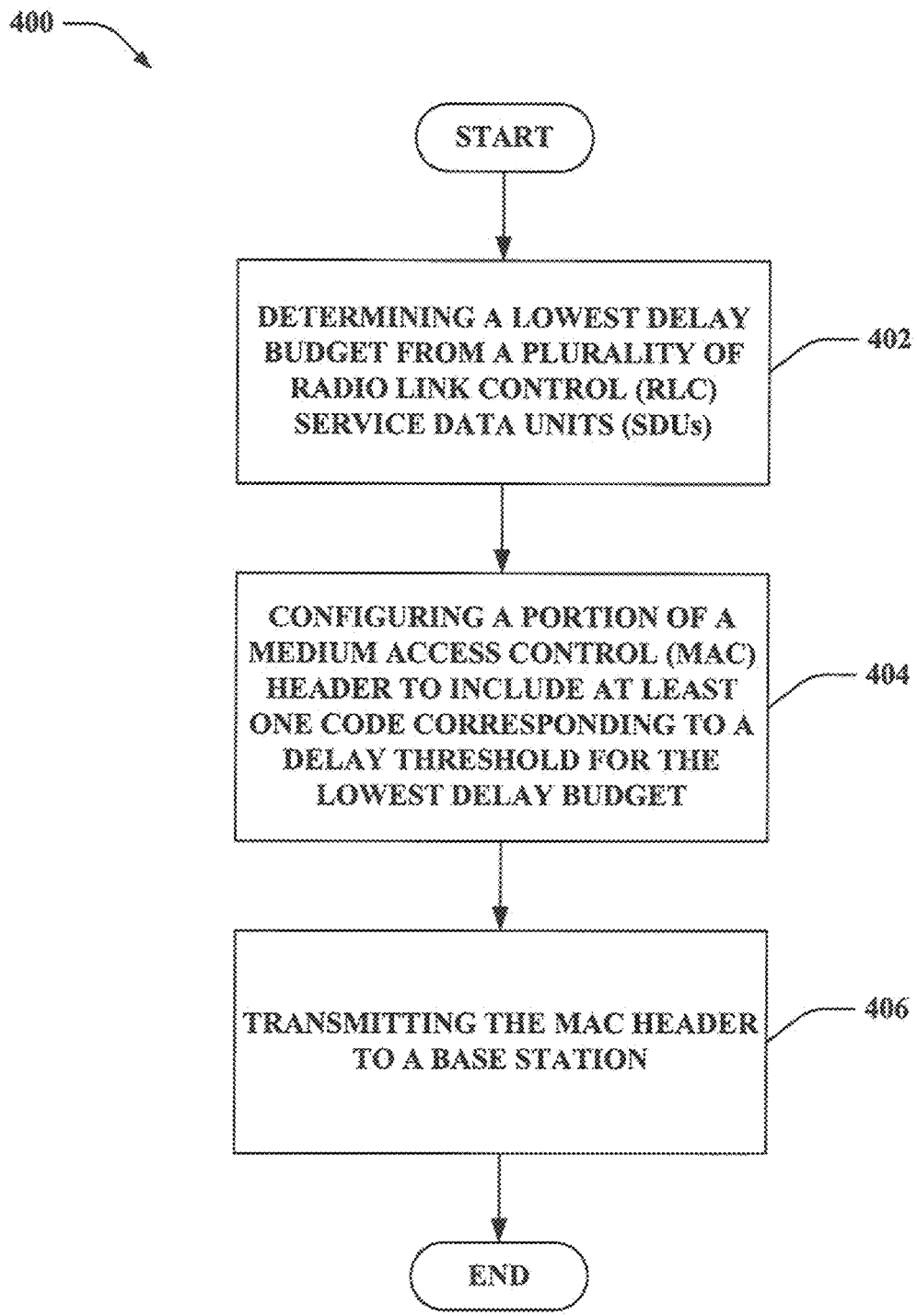
FIG. 4 is an illustration of an example methodology that facilitates providing uplink delay budget feedback in a wireless communication environment.
Figure 5:
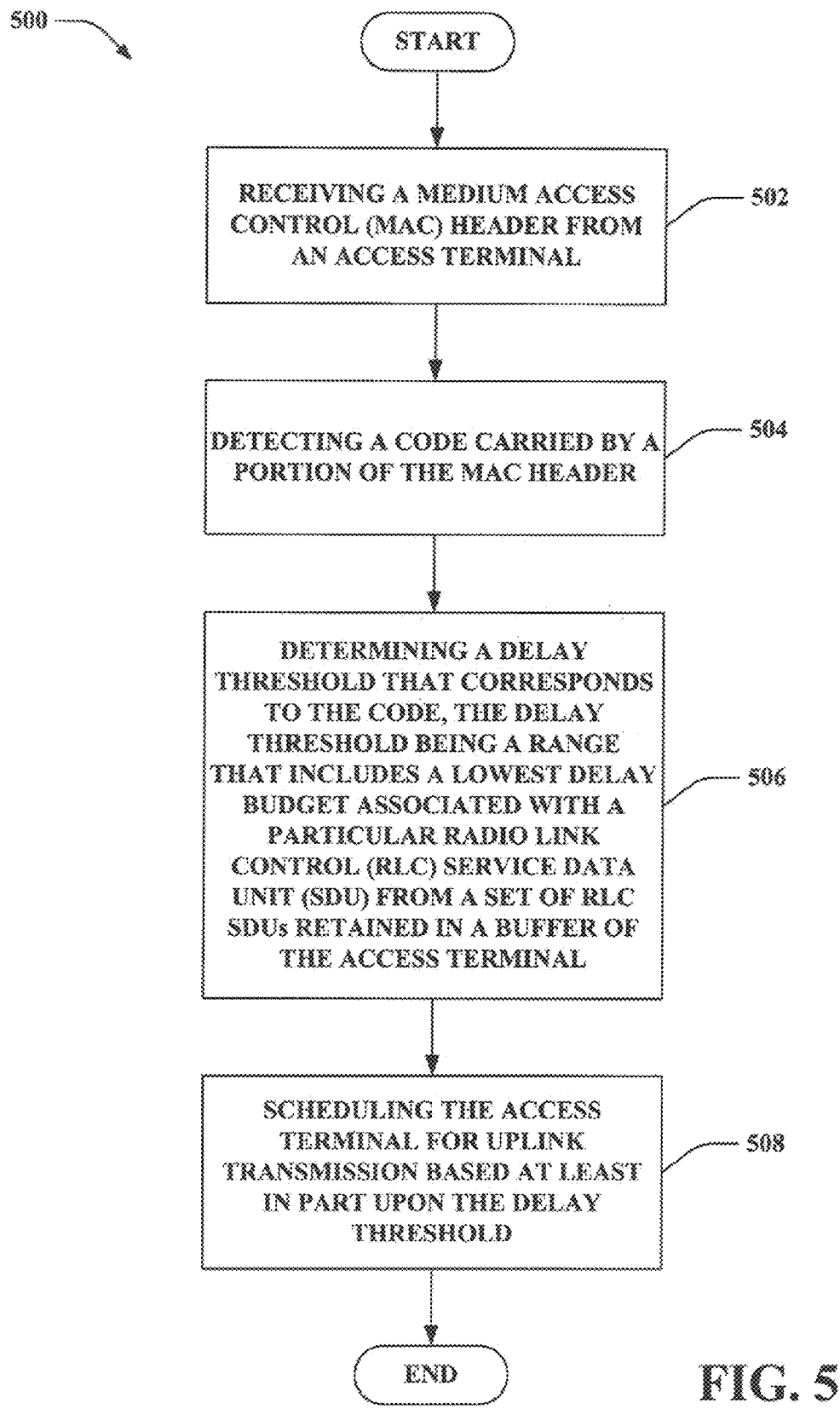
FIG. 5 is an illustration of an example methodology that facilitates obtaining uplink delay budget feedback in a wireless communication environment.

Referring to FIGS. 4-5, methodologies relating to providing and employing uplink delay budget feedback in a wireless communication environment are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

With reference to FIG. 4, illustrated is a methodology 400 that facilitates providing uplink delay budget feedback in a wireless communication environment. At 402, a lowest delay budget from a plurality of Radio Link Control (RLC) service data units (SDUs) can be determined. A delay budget can be a maximum amount of time remaining for an RLC SDU to be retained in a buffer without being sent over an uplink prior to exceeding a corresponding delay bound. For instance, the lowest delay budget can correspond to a most urgent RLC SDU from the plurality of RLC SDUs retained in a buffer of an access terminal. According to an example, the lowest delay budget can be a head-of-line delay budget that corresponds to an RLC SDU to be transmitted first from the plurality of RLC SDUs. Pursuant to another example, the lowest delay budget can correspond to a most urgent RLC SDU within a radio bearer.

At 404, a portion of a Medium Access Control (MAC) header can be configured to include at least one code corresponding to a delay threshold for the lowest delay budget. By way of example, values of reserved bits (e.g., two reserved bits, . . . ) in the MAC header can be set to convey the delay threshold for the lowest delay budget (e.g., associated with the most urgent RLC SDU, within a radio bearer, . . . ). The delay threshold can be a range of delay budgets that includes the lowest delay budget. For example, values of the two reserved bits can be set according to a remaining delay budget of a most urgent RLC SDU that is not included in a current Transfer Block. Moreover, a mapping (e.g., predefined, configured by radio resource control (RRC), . . . ) between delay thresholds and codes (e.g., MAC header reserved bit values, . . . ) can be employed to select one or more of the at least one code for inclusion in the MAC header. According to an example, each radio bearer can be associated with a respective mapping between delay thresholds and codes; for instance, a mapping associating four delay thresholds each with a respective one of four codes (e.g., MAC header reserved bit values, '00'/'01'/'10'/'11', . . . ) can be configured by RRC per radio bearer. Following this example, a logical channel identifier that is one-to-one mapped to a particular radio bearer can be included in the MAC header, and a particular mapping between delay thresholds and codes corresponding to the particular radio bearer can be utilized to select one or more of the at least one code for inclusion in the MAC header.

At 406, the MAC header can be transmitted to a base station. Although not shown, it is contemplated that a subsequent uplink grant (e.g., yielded by the base station as a function of delay budget information carried by the MAC header, . . . ) can be obtained from the base station, and methodology 400 can return to 402 for a next Transfer Block that corresponds to the subsequent uplink grant.

Now turning to FIG. 5, illustrated is a methodology 500 that facilitates obtaining uplink delay budget feedback in a wireless communication environment. At 502, a Medium Access Control (MAC) header can be received from an access terminal. The MAC header can be obtained from the access terminal as part of a current Transfer Block. At 504, a code carried by a portion of the MAC header can be detected. For instance, the code can be carried by reserved bits (e.g., two reserved bits, . . . ) of the MAC header; thus, values of the reserved bits included in the MAC header can be recognized.

At 506, a delay threshold that corresponds to the code can be determined. The delay threshold can be a range that includes a lowest delay budget associated with a particular Radio Link Control (RLC) service data unit (SDU) from a set of Radio Link Control (RLC) service data units (SDUs) retained in a buffer of the access terminal. The particular RLC SDU, for instance, can be a most urgent RLC SDU (e.g. within a given radio bearer, not included in the current Transfer Block, . . . ). According to an example where the code is carried by reserved bits (e.g., two reserved bits, . . . ) of the MAC header, the delay threshold can be identified as a function of detected values of the reserved bits. Following this example, a mapping (e.g., predefined, configured by radio resource control (RRC), . . . ) between delay thresholds and codes (e.g., MAC header reserved bit values, . . . ) can be employed to determine the delay threshold based upon the code (e.g., reserved bit values, . . . ) included in the MAC header. Pursuant to a further illustration, each radio bearer can be associated with a respective mapping between delay thresholds and codes; for instance, a mapping associating four delay thresholds each with a respective one of four codes (e.g., MAC header reserved bit values, '00'/'01'/'10'/ '11', . . . ) can be configured by RRC per radio bearer. Following this example, a logical channel identifier that is one-to-one mapped to a particular radio bearer can be recognized from the MAC header, and a particular mapping between delay thresholds and codes corresponding to the particular radio bearer can be utilized to decipher the delay threshold based upon the code carried by the portion of the MAC header. At 508, the access terminal can be scheduled for uplink transmission based at least in part upon the delay threshold. Scheduling can additionally or alternatively be based at least in part upon radio conditions, traffic volume, disparate aspects of Quality of Service (QoS) (e.g., throughput, bit error rate, . . . ), and the like.

It will be appreciated that, in accordance with one or more aspects described herein, inferences can be made regarding providing and/or employing uplink delay budget feedback in a wireless communication environment. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to optimizing an order of RLC SDUs retained in a buffer of an access terminal for transmission over an uplink to identify a most urgent RLC SDU. By way of further illustration, an inference can be made related to determining optimized delay budget ranges for mappings between codes and delay thresholds per radio bearer. It will be appreciated that the foregoing examples are illustrative in nature and are not intended to limit the number of inferences that can be made or the manner in which such inferences are made in conjunction with the various embodiments and/or methods described herein.

Figure 6:
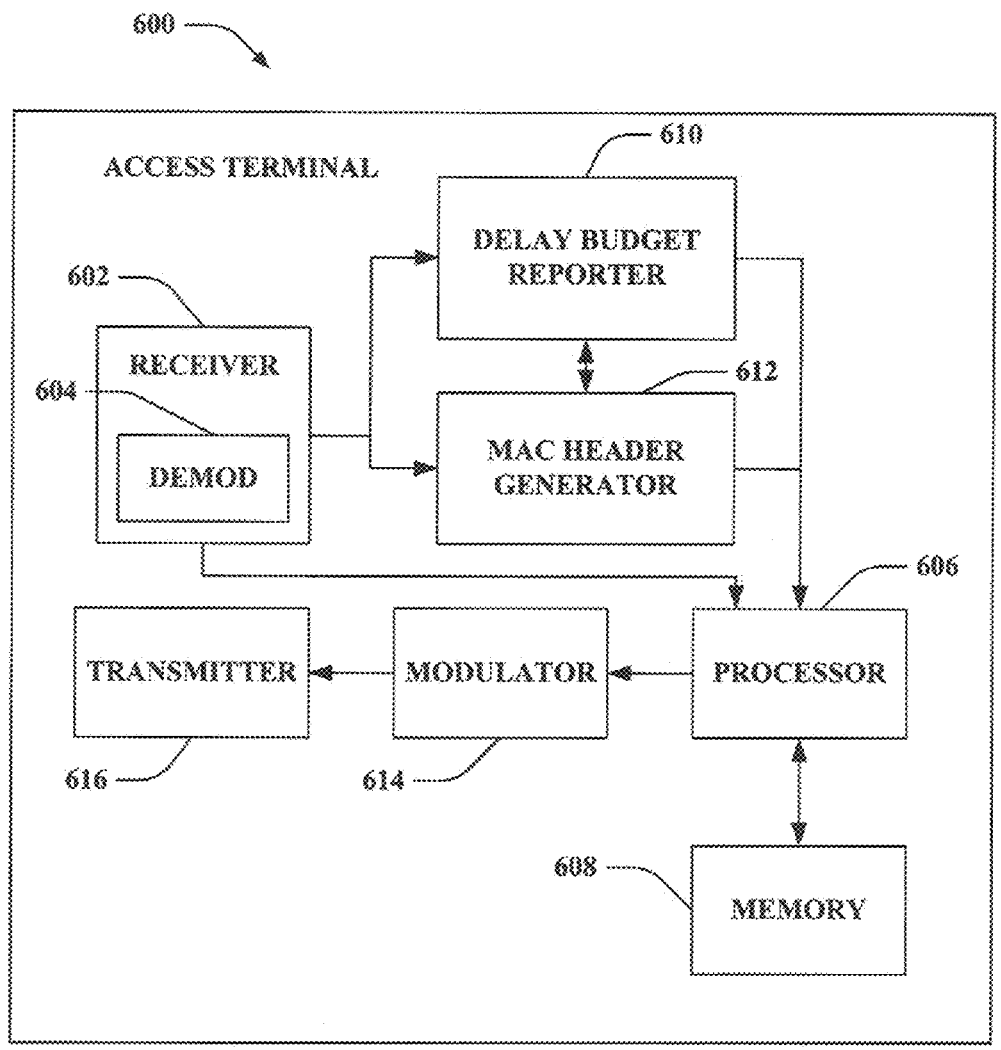
FIG. 6 is an illustration of an example access terminal that yields uplink delay budget feedback in a wireless communication system.

FIG. 6 is an illustration of an access terminal 600 that yields uplink delay budget feedback in a wireless communication system. Access terminal 600 comprises a receiver 602 that receives a signal from, for instance, a receive antenna (not shown), and performs typical actions thereon (e.g., filters, amplifies, downconverts, etc.) the received signal and digitizes the conditioned signal to obtain samples. Receiver 602 can be, for example, an MMSE receiver, and can comprise a demodulator 604 that can demodulate received symbols and provide them to a processor 606 for channel estimation. Processor 606 can be a processor dedicated to analyzing information received by receiver 602 and/or generating information for transmission by a transmitter 616, a processor that controls one or more components of access terminal 600, and/or a processor that both analyzes information received by receiver 602, generates information for transmission by transmitter 616, and controls one or more components of access terminal 600.

Access terminal 600 can additionally comprise memory 608 that is operatively coupled to processor 606 and that can store data to be transmitted, received data, and any other suitable information related to performing the various actions and functions set forth herein. Memory 608, for instance, can store protocols and/or algorithms associated with determining and/or indicating delay budget information. Memory 608 can also retain RLC SDUs to be sent over an uplink; however, the claimed subject matter is not so limited (e.g., access terminal 600 can include a buffer (not shown) that can be substantially similar to buffer 206 of FIG. 2, such buffer can be included in memory 608, separate from memory 608, a combination thereof, and so forth, . . . ).

It will be appreciated that the data store (e.g., memory 608) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 608 of the subject systems and methods is intended to comprise, without being limited to, these and any other suitable types of memory.

Processor 606 can be operatively coupled to a delay budget reporter 610 and/or a MAC header generator 612. Delay budget reporter 610 can be substantially similar to delay budget reporter 208 of FIG. 2 and/or MAC header generator 612 can be substantially similar to MAC header generator 210 of FIG. 2. Although shown as being separate from delay budget reporter 610, it is contemplated that delay budget reporter 610 can include MAC header generator 612. Delay budget reporter 610 can determine a head-of-line delay budget of a most urgent RLC SDU. Further, delay budget reporter 610 can detect delay budgets for a plurality of disparate RLC SDUs waiting to be transferred from access terminal 600. MAC header generator 612 can configure a portion of a MAC header to include a code corresponding to the head-of-line delay budget of the most urgent RLC SDU. For instance, MAC header generator 612 can incorporate a two bit code, which can be carried by two reserved bits, into the MAC header. The code can correspond to a delay threshold, which is a range of delay budgets that includes the head-of-line delay budget of the most urgent RLC SDU. According to an illustration, delay budget reporter 610 can convey the delay budget information for a most urgent RLC SDU that is not included in a current Transfer Block. Although not shown, it is contemplated that access terminal 600 can include an RRC that can be substantially similar to RRC 302 of FIG. 3. Moreover, a mapping of four delay thresholds to codes (e.g., values for reserved bits of the MAC header, . . . ) can be configured by such RRC per radio bearer, for example. Access terminal 600 still further comprises a modulator 614 and a transmitter 616 that transmits data, signals, etc. to a base station. Although depicted as being separate from the processor 606, it is to be appreciated that delay budget reporter 610, MAC header generator 612 and/or modulator 614 can be part of processor 606 or a number of processors (not shown).

Figure 7:
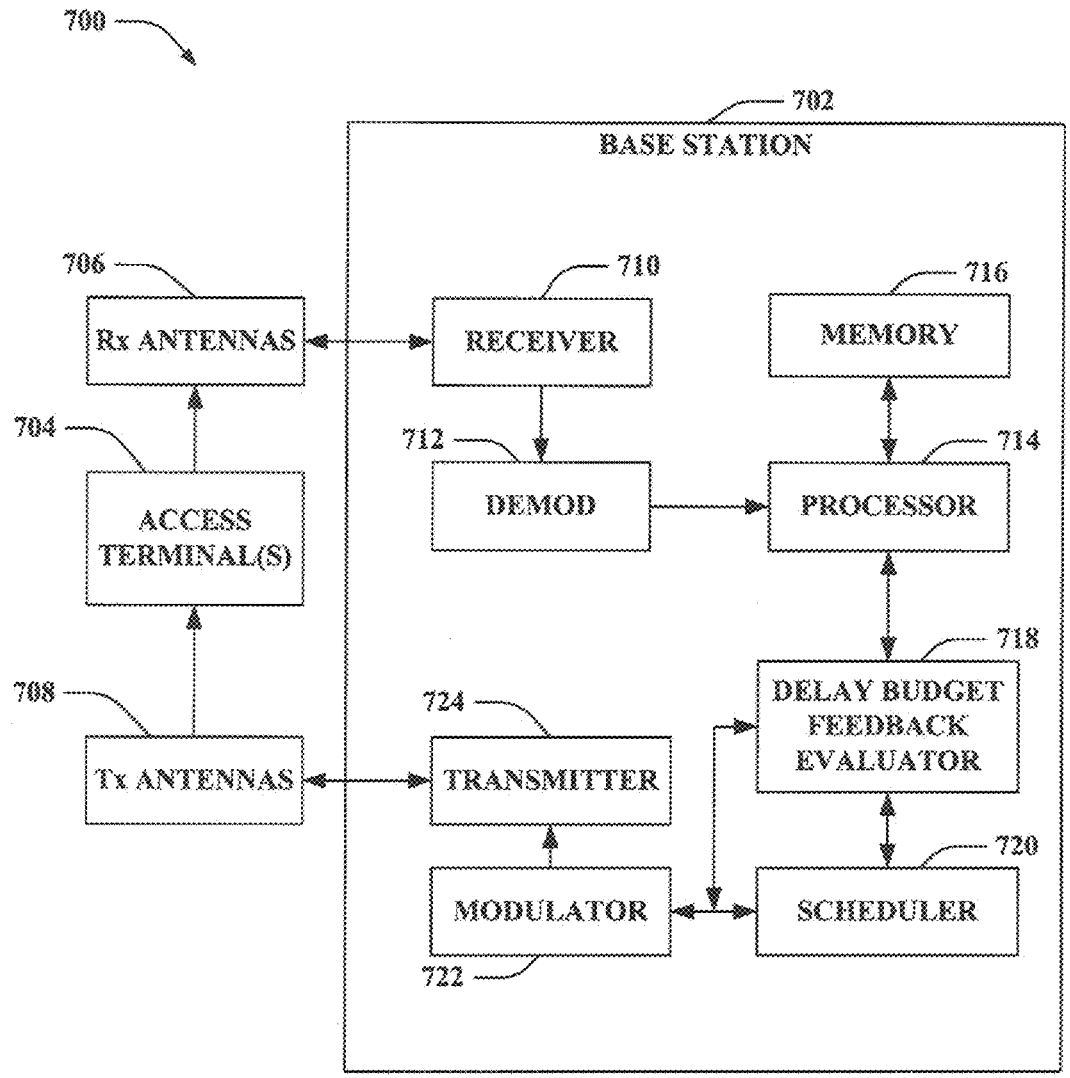
FIG. 7 is an illustration of an example system that employs uplink delay budget feedback in a wireless communication environment.

FIG. 7 is an illustration of a system 700 that employs uplink delay budget feedback in a wireless communication environment. System 700 comprises a base station 702 (e.g., access point, . . . ) with a receiver 710 that receives signal(s) from one or more access terminals 704 through a plurality of receive antennas 706, and a transmitter 724 that transmits to the one or more access terminals 704 through a transmit antenna 708. Receiver 710 can receive information from receive antennas 706 and is operatively associated with a demodulator 712 that demodulates received information. Demodulated symbols are analyzed by a processor 714 that can be similar to the processor described above with regard to FIG. 6, and which is coupled to a memory 716 that stores data to be transmitted to or received from access terminal(s) 704 and/or any other suitable information related to performing the various actions and functions set forth herein. Processor 714 is further coupled to a delay budget feedback evaluator 718 that analyzes received MAC headers to recognize delay budget related feedback from access terminal(s) 704. Moreover, base station 702 can include a scheduler 720 that can allocate uplink resources to access terminal(s) 704 as a function of the delay budget related feedback identified from the received MAC headers. It is to be appreciated that delay budget feedback evaluator 718 can be substantially similar to delay budget feedback evaluator 212 of FIG. 2 and/or scheduler 720 can be substantially similar to scheduler 214 of FIG. 2. Moreover, although not shown, it is contemplated that base station 702 can include an RRC, which can be substantially similar to RRC 304 of FIG. 3. Base station 702 can further include a modulator 722. Modulator 722 can multiplex a frame for transmission by a transmitter 724 through antennas 708 to access terminal(s) 704 in accordance with the aforementioned description. Although depicted as being separate from the processor 714, it is to be appreciated that delay budget feedback evaluator 718, scheduler 720, and/or modulator 722 can be part of processor 714 or a number of processors (not shown).

Figure 8:
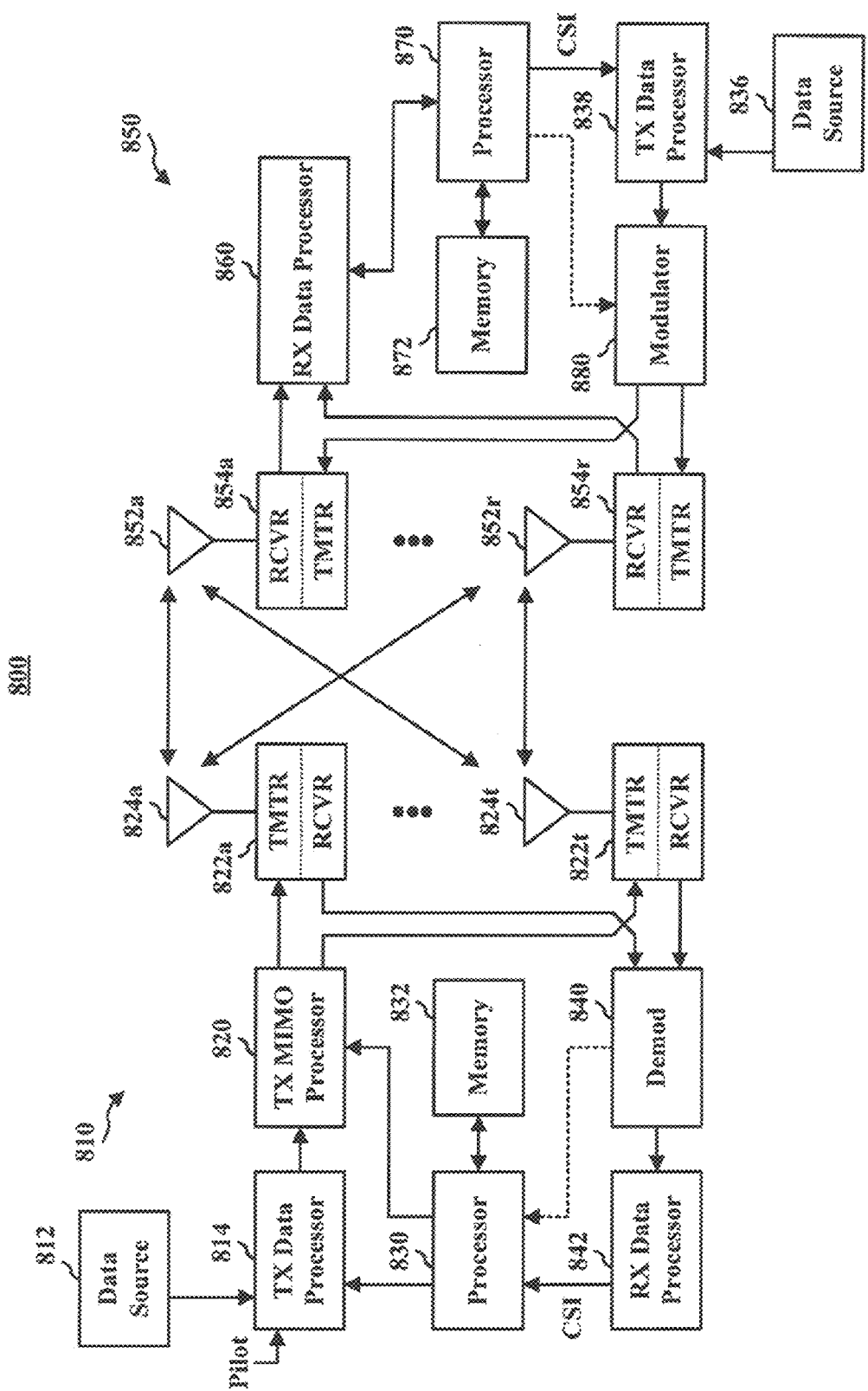
FIG. 8 is an illustration of an example wireless network environment that can be employed in conjunction with the various systems and methods described herein.

FIG. 8 shows an example wireless communication system 800. The wireless communication system 800 depicts one base station 810 and one access terminal 850 for sake of brevity. However, it is to be appreciated that system 800 can include more than one base station and/or more than one access terminal, wherein additional base stations and/or access terminals can be substantially similar or different from example base station 810 and access terminal 850 described below. In addition, it is to be appreciated that base station 810 and/or access terminal 850 can employ the systems (FIGS. 1-3, 6-7, and 9-10) and/or methods (FIGS. 4-5) described herein to facilitate wireless communication there between.

At base station 810, traffic data for a number of data streams is provided from a data source 812 to a transmit (TX) data processor 814. According to an example, each data stream can be transmitted over a respective antenna. TX data processor 814 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 850 to estimate channel response. The multiplexed pilot and coded data for each data stream can be modulated (e.g. symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 830.

The modulation symbols for the data streams can be provided to a TX MIMO processor 820, which can further process the modulation symbols (e.g., for OFDM). TX MIMO processor 820 then provides $N_T$ modulation symbol streams to $N_T$ transmitters (TMTR) 822a through 822t. In various embodiments, TX MIMO processor 820 applies beamforming weights to the symbols of the data streams and to the antenna from which the symbol is being transmitted.

Each transmitter 822 receives and processes a respective symbol stream to provide one or more analog signals, and further conditions (e.g. amplifies, filters, and upconverts) the analog signals to provide a modulated signal suitable for transmission over the MIMO channel. Further, $N_T$ modulated signals from transmitters 822a through 822t are transmitted from $N_T$ antennas 824a through 824t, respectively.

At access terminal 850, the transmitted modulated signals are received by $N_R$ antennas 852a through 852r and the received signal from each antenna 852 is provided to a respective receiver (RCVR) 854a through 854r. Each receiver 854 conditions (e.g., filters, amplifies, and downconverts) a respective signal, digitizes the conditioned signal to provide samples, and further processes the samples to provide a corresponding "received" symbol stream.

An RX data processor 860 can receive and process the $N_R$ received symbol streams from $N_R$ receivers 854 based on a particular receiver processing technique to provide $N_T$ "detected" symbol streams. RX data processor 860 can demodulate, deinterleave, and decode each detected symbol stream to recover the traffic data for the data stream. The processing by RX data processor 860 is complementary to that performed by TX MIMO processor 820 and TX data processor 814 at base station 810.

A processor 870 can periodically determine which available technology to utilize as discussed above. Further, processor 870 can formulate a reverse link message comprising a matrix index portion and a rank value portion.

The reverse link message can comprise various types of information regarding the communication link and/or the received data stream. The reverse link message can be processed by a TX data processor 838, which also receives traffic data for a number of data streams from a data source 836, modulated by a modulator 880, conditioned by transmitters 854a through 854r, and transmitted back to base station 810.

At base station 810, the modulated signals from access terminal 850 are received by antennas 824, conditioned by receivers 822, demodulated by a demodulator 840, and processed by a RX data processor 842 to extract the reverse link message transmitted by access terminal 850. Further, processor 830 can process the extracted message to determine which preceding matrix to use for determining the beamforming weights.

Processors 830 and 870 can direct (e.g., control, coordinate, manage, etc.) operation at base station 810 and access terminal 850, respectively. Respective processors 830 and 870 can be associated with memory 832 and 872 that store program codes and data. Processors 830 and 870 can also perform computations to derive frequency and impulse response estimates for the uplink and downlink, respectively.

In an aspect, logical channels are classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can comprise a Multicast Control Channel (MCCH), which is a Point-to-multipoint DL channel used for transmitting Multimedia Broadcast and Multicast Service (MBMS) scheduling and control information for one or several MTCHs. Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include a Multicast Traffic Channel (MTCH) for Point-to-multipoint DL channel for transmitting traffic data.

In an aspect, Transport Channels are classified into DL and UL. DL Transport Channels comprise a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE, . . . ) by being broadcasted over an entire cell and being mapped to Physical layer (PHY) resources that can be used for other control/traffic channels. The UL Transport Channels can comprise a Random Access Channel (RACH), a Request Channel (REQCH), a Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and/or Broadband Pilot Channel (BPICH).

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 9:
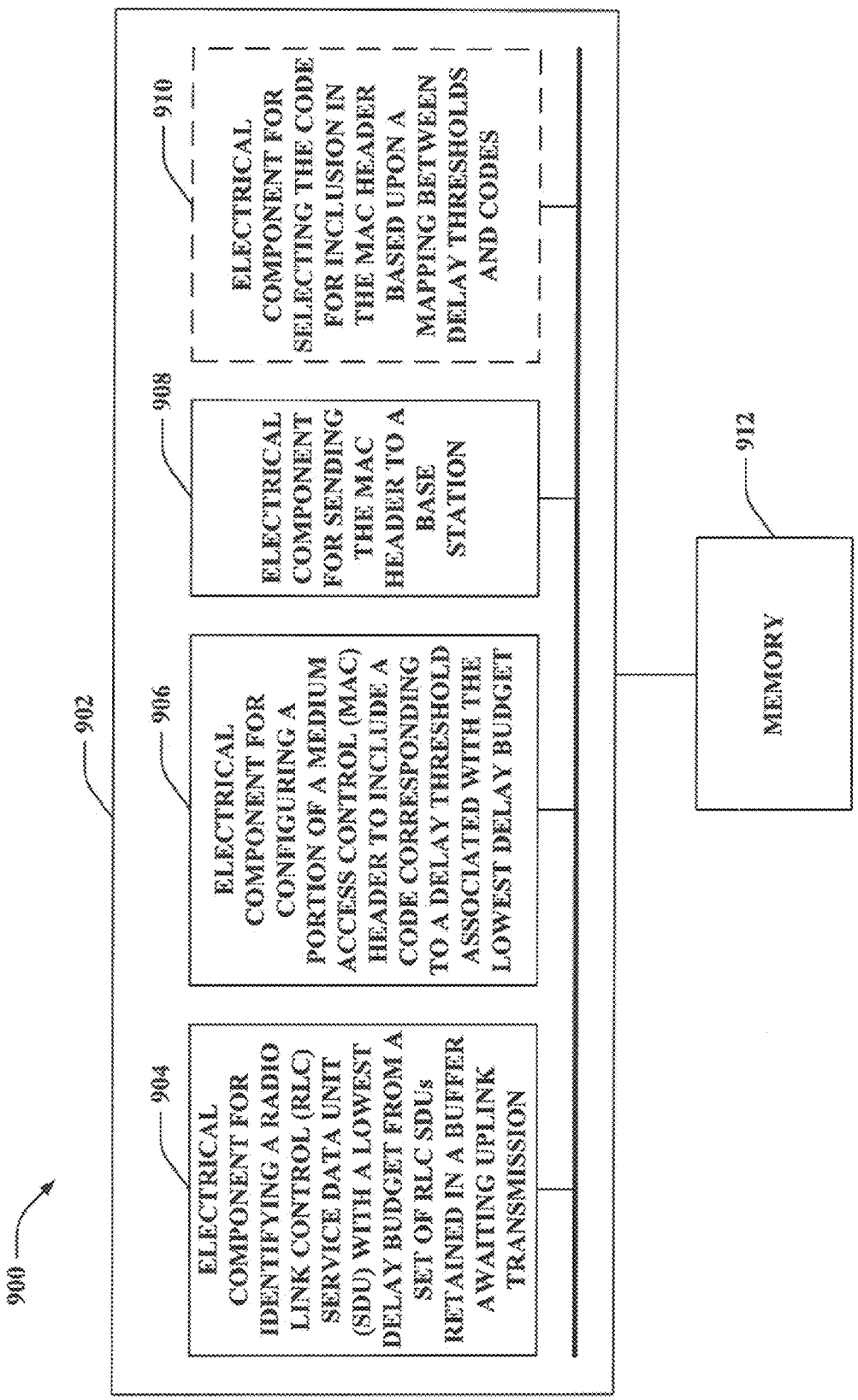
FIG. 9 is an illustration of an example system that enables signaling delay budget related feedback to a base station in a wireless communication environment.

With reference to FIG. 9, illustrated is a system 900 that enables signaling delay budget related feedback to a base station in a wireless communication environment. For example, system 900 can reside within an access terminal. It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction. For instance, logical grouping 902 can include an electrical component for identifying a Radio Link Control (RLC) service data unit (SDU) with a lowest delay budget from a set of RLC SDUs retained in a buffer awaiting uplink transmission 904. Moreover, logical grouping 902 can include an electrical component for configuring a portion of a Medium Access Control (MAC) header to include a code corresponding to a delay threshold associated with the lowest delay budget 906. Further, logical grouping 902 can include an electrical component for sending the MAC header to a base station 908. Logical grouping 902 can also optionally include an electrical component for selecting the code for inclusion in the MAC header based upon a mapping between delay thresholds and codes 910. Additionally, system 900 can include a memory 912 that retains instructions for executing functions associated with electrical components 904, 906, 908, and 910. While shown as being external to memory 912, it is to be understood that one or more of electrical components 904, 906, 908, and 910 can exist within memory 912.

Figure 10:
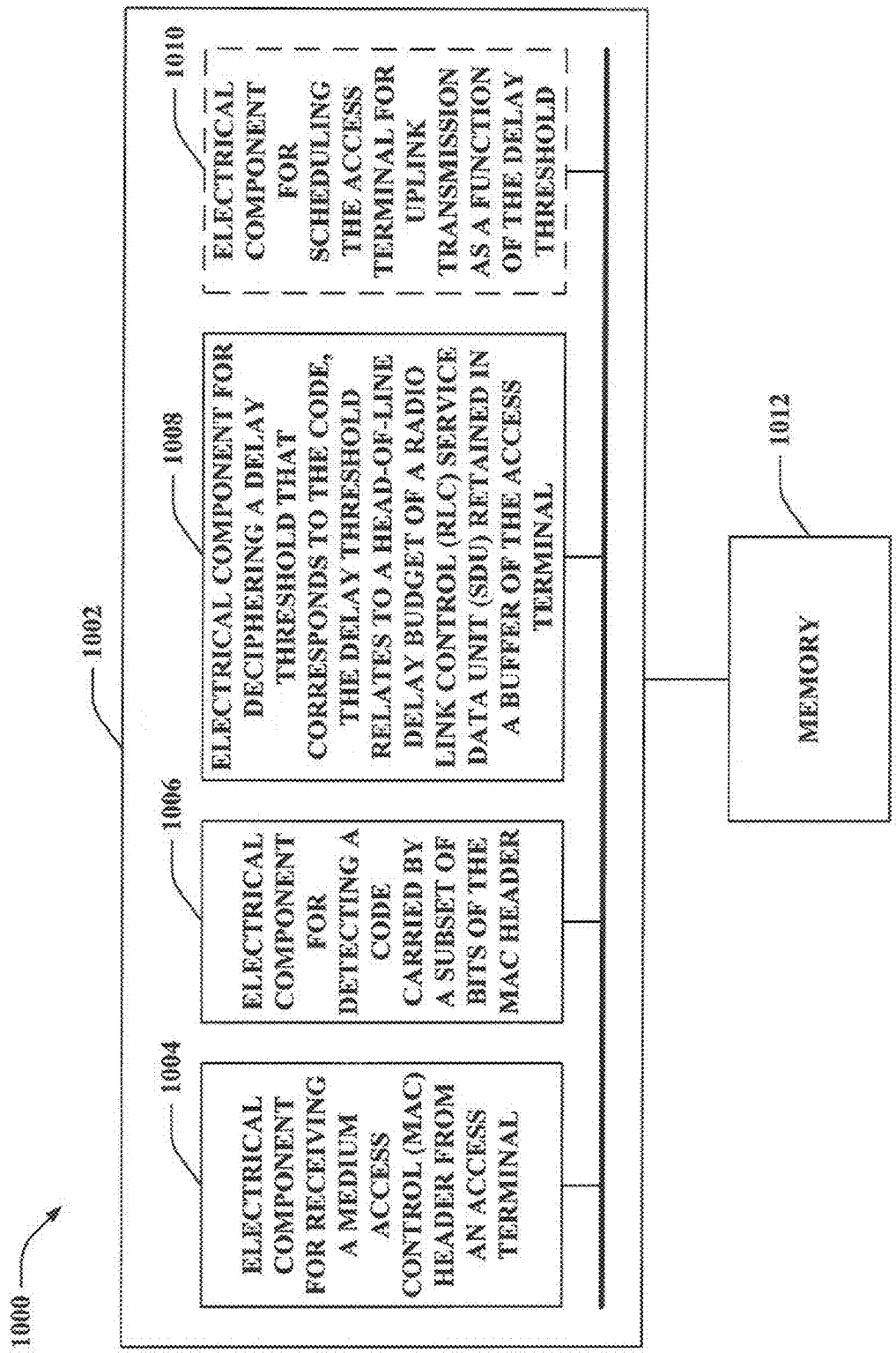
FIG. 10 is an illustration of an example system that enables obtaining delay budget related feedback from an access terminal in a wireless communication environment.

With reference to FIG. 10, illustrated is a system 1000 that enables obtaining delay budget related feedback from an access terminal in a wireless communication environment. For example, system 1000 can reside at least partially within a base station. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for receiving a Medium Access Control (MAC) header from an access terminal 1004. Further, logical grouping 1002 can include an electrical component for detecting a code carried by a subset of bits of the MAC header 1006. Moreover, logical grouping 1002 can include an electrical component for deciphering a delay threshold that corresponds to the code 1008. The delay threshold, for instance, can relate to a head-of-line delay budget of a Radio Link Control (RLC) service data unit (SDU) retained in a buffer of the access terminal. Additionally, logical grouping 1002 can optionally include an electrical component for scheduling the access terminal for uplink transmission as a function of the delay threshold 1010. Additionally, system 1000 can include a memory 1012 that retains instructions for executing functions associated with electrical components 1004, 1006, 1008, and 1010. While shown as being external to memory 1012, it is to be understood that one or more of electrical components 1004, 1006, 1008, and 1010 can exist within memory 1012.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates providing uplink delay budget feedback in a wireless communication environment, comprising:
   determining a lowest delay budget from a plurality of Radio Link Control (RLC) service data units (SDUs);
   configuring a portion of a Medium Access Control (MAC) header to include at least one code corresponding to a delay threshold for the lowest delay budget; and
   transmitting the MAC header to a base station.

2. The method of claim 1, wherein the lowest delay budget is a head-of-line delay budget that corresponds to an RLC SDU to be transmitted first from the plurality of RLC SDUs.

3. The method of claim 1, configuring the portion of the MAC header to include at least one code further comprises setting values of two reserved bits in the MAC header to convey the delay threshold associated with an RLC SDU to be transmitted first within a radio bearer.

4. The method of claim 1, configuring the portion of the MAC header to include at least one code further comprises setting values of two reserved bits in the MAC header according to a remaining delay budget of an RLC SDU that is not included in a current Transfer Block.

5. The method of claim 1, further comprising selecting one or more of the at least one code for inclusion in the MAC header based upon a mapping between delay thresholds and codes.

6. The method of claim 5, wherein each radio bearer is associated with a respective mapping between delay thresholds and codes.

7. The method of claim 5, wherein the mapping is configured by radio resource control (RRC) per radio bearer to associate four delay thresholds each with a respective one of four codes.

8. The method of claim 5, further comprising:
   incorporating a logical channel identifier that is one-to-one mapped to a particular radio bearer in the MAC header; and
   utilizing a particular mapping between delay thresholds and codes corresponding to the particular radio bearer to select the one or more of the at least one code for inclusion in the MAC header.

9. A wireless communications apparatus, comprising:
   a memory that retains instructions related to identifying a lowest delay budget from a plurality of Radio Link Control (RLC) service data units (SDUs), setting a portion of a Medium Access Control (MAC) header to include at least one code corresponding to a delay threshold for the lowest delay budget, and sending the MAC header to a base station; and
   a processor, coupled to the memory, configured to execute the instructions retained in the memory.

10. The wireless communications apparatus of claim 9, wherein the memory further retains instructions related to setting values of two reserved bits in the MAC header to convey the delay threshold associated with an RLC SDU to be transmitted first within a radio bearer.

11. The wireless communications apparatus of claim 9, wherein the memory further retains instructions related to establishing values of two reserved bits in the MAC header according to a remaining delay budget of an RLC SDU that is not included in a current Transfer Block.

12. The wireless communications apparatus of claim 9, wherein the memory further retains instructions related to choosing one or more of the at least one code for inclusion in the MAC header based upon a mapping between delay thresholds and codes.

13. The wireless communications apparatus of claim 12, wherein the mapping is configured by radio resource control (RRC) per radio bearer to associate four delay thresholds each with a respective one of four codes.

14. The wireless communications apparatus of claim 12, wherein the memory further retains instructions related to incorporating a logical channel identifier that is one-to-one mapped to a particular radio bearer in the MAC header, and employing a particular mapping between delay thresholds and codes corresponding to the particular radio bearer to choose the one or more of the at least one code for inclusion in the MAC header.

15. A wireless communications apparatus that enables signaling delay budget related feedback to a base station in a wireless communication environment, comprising:
- means for identifying a Radio Link Control (RLC) service data unit (SDU) with a lowest delay budget from a set of RLC SDUs retained in a buffer awaiting uplink transmission;
- means for configuring a portion of a Medium Access Control (MAC) header to include a code corresponding to a delay threshold associated with the lowest delay budget; and
- means for sending the MAC header to a base station.

16. The wireless communications apparatus of claim 15, wherein the portion of the MAC header is two reserved bits.

17. The wireless communications apparatus of claim 16, wherein the two reserved bits convey the delay threshold associated with the RLC SDU with the lowest delay budget which is to be transmitted first within a radio bearer.

18. The wireless communication apparatus of claim 16, wherein the two reserved bits convey the delay threshold associated with the RLC SDU with the lowest delay budget excluded from a current Transfer Block.

19. The wireless communications apparatus of claim 15, further comprising means for selecting the code for inclusion in the MAC header based upon a mapping between delay thresholds and codes.

20. The wireless communications apparatus of claim 19, wherein the mapping is configured by radio resource control (RRC) per radio bearer to associate four delay thresholds each with a respective one of four codes.

21. A computer program product, comprising:
- a computer-readable nontransitory storage medium comprising:
  - code for identifying a Radio Link Control (RLC) service data unit (SDU) with a lowest delay budget from a set of RLC SDUs retained in a buffer awaiting uplink transmission;
  - code for setting values of two reserved bits included in a Medium Access Control (MAC) header to convey a delay threshold associated with the lowest delay budget; and
  - code for sending the MAC header to a base station.

22. The computer program product of claim 21, wherein the values of the two reserved bits included in the MAC header convey the delay threshold associated with the RLC SDU with the lowest delay budget which is to be transmitted first within a radio bearer.

23. The computer program product of claim 21, wherein the values of the two reserved bits included in the MAC header convey the delay threshold associated with the RLC SDU with the lowest delay budget excluded from a current Transfer Block.

24. The computer program product of claim 21, wherein the computer-readable medium further comprises code for selecting the values of the two reserved bits as a function of a mapping configured by radio resource control (RRC) per radio bearer.

25. In a wireless communications system, an apparatus comprising:
- a processor configured to:
  - determine a lowest delay budget from a plurality of Radio Link Control (RLC) service data units (SDUs);
  - configure a portion of a Medium Access Control (MAC) header to include at least one code corresponding to a delay threshold for the lowest delay budget; and
  - transmit the MAC header to a base station.

26. In a wireless communications system, an apparatus comprising:
- a processor configured to:
  - detect a code carried by two reserved bits included in a Medium Access Control (MAC) header received from an access terminal;
  - determine a delay threshold that corresponds to the code, the delay threshold being a range that includes a lowest delay budget associated with a particular Radio Link Control (RLC) service data unit (SDU) from a set of RLC SDUs retained in a buffer of the access terminal; and
  - schedule the access terminal for uplink transmission based at least in part upon the delay threshold.

* * * * *